United States Patent [19]

Shelley, Jr.

[11] 4,289,811

[45] Sep. 15, 1981

[54] STABLE AQUEOUS DISPERSIONS OF MIXED RESINS AND PROCESS FOR USE AS COATING COMPOSITIONS

[75] Inventor: Ralph R. Shelley, Jr., Louisville, Ky.

[73] Assignee: Celanese Corporation, New York, N.Y.

[21] Appl. No.: 123,136

[22] Filed: Feb. 21, 1980

[51] Int. Cl.$^3$ .............................................. B05D 7/22
[52] U.S. Cl. .................................. 427/239; 206/524.3; 220/1 BC; 220/462; 260/29.67 A; 260/29.6 NR; 260/29.4 UA; 427/236; 427/386; 427/388.2; 427/388.3; 427/388.4; 525/514; 525/518; 525/923; 528/246
[58] Field of Search ............... 260/29.4 UA, 29.6 TA, 260/29.6 NR; 427/386, 388.1, 388.2, 388.3, 388.4, 388.5, 230, 234, 239, 236; 525/518, 923, 514; 528/246; 206/524.3; 215/DIG. 6; 220/1 BC, 454, 457, 470, 462

[56] References Cited

U.S. PATENT DOCUMENTS

| | | |
|---|---|---|
| 3,105,826 | 10/1963 | Jaggard . |
| 3,118,848 | 1/1964 | Lombardi et al. .................. 260/29.3 |
| 3,156,740 | 11/1964 | Bussell . |
| 3,198,850 | 8/1965 | Levantin . |
| 3,215,756 | 11/1965 | Lombardi et al. . |
| 3,331,805 | 7/1967 | Mandel . |
| 3,338,860 | 8/1967 | Vasta ................................. 260/33.4 |
| 3,378,601 | 4/1968 | Tanaka et al. . |
| 3,403,088 | 9/1968 | Hart ................................. 204/181 R |
| 3,418,392 | 12/1968 | Leitner . |
| 3,467,730 | 9/1969 | Hicks . |
| 3,492,252 | 1/1970 | Euchner et al. ......................... 260/8 |
| 3,736,279 | 5/1973 | Camelon et al. ............... 525/518 X |
| 3,871,896 | 3/1975 | Matsudaira et al. . |
| 3,908,049 | 9/1975 | Fito ..................................... 427/386 |
| 3,960,979 | 6/1976 | Khanna ............................. 260/14 X |
| 4,110,288 | 8/1978 | Schirmann et al. ........ 260/29.4 UA |
| 4,131,632 | 12/1978 | Suzuki et al. .................. 525/518 X |
| 4,136,075 | 1/1979 | Finn et al. .................. 260/29.6 TA |
| 4,212,781 | 7/1980 | Evans et al. ................ 260/29.4 UA |

FOREIGN PATENT DOCUMENTS 854523 5/1977 Belgium .
792903 6/1979 South Africa .

*Primary Examiner*—Ronald H. Smith
*Assistant Examiner*—Thurman K. Page
*Attorney, Agent, or Firm*—Herbert P. Price; K. A. Genoni; T. J. Morgan

[57] ABSTRACT

Aqueous dispersions of mixed resins are prepared by polymerizing in the presence of an aminoplast resin a mixture of polymerizable carboxylic acid monomers and other monomers, adding to the polymerization product an epoxy resin, adding ammonia or an amine to salt the acid groups and dispersing the resin mixture in water. The aqueous dispersions are useful as can coatings.

17 Claims, No Drawings

STABLE AQUEOUS DISPERSIONS OF MIXED RESINS AND PROCESS FOR USE AS COATING COMPOSITIONS

BACKGROUND OF THE INVENTION

This invention relates generally to thermosetting coating compositions that are useful for coating substrates such as metal surfaces.

In the manufacture of metal containers, a thin protective synthetic resin coating is applied to the interior of the container. The synthetic resins employed for coating the interior of the metal container are nominally heat-curable polymeric compositions which are applied in the form of a solution or dispersion in a volatile organic solvent. During the drying and baking cycle of a coating operation, there is the problem of contending with the hazard of solvent vaporization and recovery.

The can manufacturing industry utilizes cans which are fabricated from aluminum or steel. The interior of the cans are coated with a thin thermoset film to prevent the contact of the interior metal surface of the can with its contents. Such coatings ideally should have good adhesion to the interior metal surface, low extractables to prevent contamination of the container contents, and a rapid cure rate for economy of container manufacture. Typical synthetic resin coating compositions include vinyls, butadienes, epoxies, alkyl/aminoplasts, and oleoresinous materials. Many of these resinous coating systems have the disadvantage that they require batch premixing just prior to a coating operation, or they require continuous in line mixing in a container coating assembly.

Various technical investigations have addressed the most serious of the problems relating to industrial scale application of protective coatings to articles of manufacture.

U.S. Pat. No. 3,118,848 describes coating compositions which are prepared by mixing together a water-soluble salt of a vinyl polymer, and a water-soluble epoxy or polyhydroxy compound. One or more water-soluble phenol-aldehyde or amino resins, notably water-soluble urea-aldehyde or melamine-aldehyde resins, may optionally be included as curing agents where low baking temperatures are contemplated.

U.S. Pat. No. 3,156,740 describes thermosetting acrylic resin compositions adapted for application as coatings to protect metal surfaces from the action of water, soap, grease, light and prolonged heat. Illustrative of the preparation of a thermosetting resin composition, there are co-reacted (a) a copolymer of 2–10% of acrylic acid, 4.5–88% styrene and 9–93% of 2-ethylhexyl acrylate and (b) 1-epoxyethyl-3,4-epoxycyclohexane, and then there is mixed therein (c) a melamineformaldehyde resin in an amount of 5–50% by weight based on the total non-volatile content of the composition.

U.S. Pat. No. 3,215,756 describes heat-curable mixtures of a vinyl polymer with an epoxy compound in the presence of an amino resin. For example, a methacrylic acid/methyl acrylate copolymer is admixed with a polyglycidyl ether of Bisphenol A and a urea-formaldehyde resin in an organic solvent, and then coated on a substrate and baked to a thermoset film.

U.S. Pat. No. 3,403,088 describes water-dispersed coating compositions which can be applied by electrodeposition. The coating compositions contain an at least partially neutralized acrylic interpolymer and an amine-aldehyde condensation product or a polyepoxide or both.

U.S. Pat. No. 3,418,392 describes a crosslinking composition for an interpolymer (e.g., styrene/n-butyl acrylate/methacrylamide) which consists of a mixture of a polycycloaliphatic polyepoxide (e.g., 3,4-epoxy-6-methylcyclohexylmethyl 2,4-epoxy-6-methylcyclohexanecarboxylate) and a reactive triazine compound (e.g., hexamethoxymethylmelamine). The coating composition is recommended for use in textile print pastes, padding liquor for pigment dyeing of textiles, nonwoven textile impregnation dispersions, and generally as solvent based protective coatings for metal surfaces and the like.

U.S. Pat. No. 3,467,730 describes heat-convertible coating compositions which are prepared from carboxy-containing copolymers, epoxide resins and aminoplast resins. In an example, 37 grams of a 50% copolymer (72% styrene, 20% methyl acrylate and 8% acrylic acid) solution, 6.9 grams of a polyglycidyl ether of Bisphenol A and 8.3 grams of a butylated urea-formaldehyde resin were blended, drawn down on glass, and cured at 200° C. for 30 minutes.

U.S. Pat. No. 3,908,049, describes a method for coating metal surfaces which involves preparing an aqueous dispersion containing a mixture of a neutralized water-dispersible carboxylic acid containing polymer, a water-dispersible heat-curable thermosetting aminoplast or polyepoxide resin and a water-insoluble, long chain monohydroxy alcohol having 8–36 carbon atoms, applying the aqueous dispersion to a metal surface, and baking the coating at 350°–450° F. to volatilize the alcohol and cure the coating.

U.S. Pat. No. 3,960,979 describes a fast curing high solids coating composition which can be applied to the interior of food and beverage cans with a hot melt spray gun. The coating composition is a blend of (a) a low molecular weight epoxy resin (b) a liquid nitrogen resin or phenolic crosslinking agent, (c) a flexibilizing polyol, (d) and inorganic or organic monomeric or polymeric acid which acts both as reactant and catalyst, and optionally (e) a surface modifier such as an acrylic polymer containing acrylic acid.

There is continuing research effort directed to the development of improved heat-curable resin coating systems adapted for application as protective films on metal surfaces and other substrates.

Accordingly, it is an object of this invention to provide an improved water-reducible heat-curable thermosetting coating composition adapted for the protective coating of metal surfaces.

It is another object of this invention to provide a coating system which comprises a stable dispersion of heat-curable mixed resin solids in water.

It is a further object of this invention to provide a stable water-reducible epoxy resin dispersion adapted for one package baked coating applications.

Other objects and advantages of the present invention shall become apparent from the accompanying description and examples.

DESCRIPTION OF THE INVENTION

One or more objects of the present invention are accomplished by the provision of a process for preparing a stable aqueous dispersion of mixed resins adapted for application as a heat-curable coating composition, which process comprises the steps of (1) preparing a solution of an aminoplast in a substantially water-miscible organic solvent; (2) heating the solution and adding thereto a mixture of vinyl polymerization catalyst and α,β-olefinically unsaturated carboxylic acid monomer and at least one other vinyl polymerizable monomer to form a polymerization product solution; (3) admixing and heating together the polymerization product solution and an epoxy resin; (4) at least partially neutralizing and admixture with ammonia or an organic amine; and (5) dispersing the admixture into an aqueous medium to provide a stable aqueous dispersion of mixed resin solids.

In another embodiment, the present invention further provides a process for the preparation of a stable aqueous dispersion of mixed resins adapted for application as a thermosetting protective coating for metal surfaces, which process comprises the steps of (1) preparing a solution of an aminoplast component in a substantially water-miscible organic solvent; (2) heating and maintaining the temperature of the solution in the range between about 120°–300° F., and adding to the solution at a uniform rate over a period between about 0.5–6 hours, a blend of a vinyl polymerization catalyst and monomers comprising (a) between about 20 to about 90 weight percent based on total monomer weight of an α,β-olefinically unsaturated carboxylic acid, and (b) 10 to about 80 weight percent based on total monomer weight of at least one olefinically unsaturated monomer which is copolymerizable with the carboxylic acid monomer, thereby forming a polymerization product solution; (3) admixing and interacting at a temperature between about 100° to about 300° F., the polymerization product solution and an epoxy resin component, wherein said epoxy resin is a glycidyl polyether of a polyhydric phenol or hydrogenated phenol and contains an average of more than one epoxide group per molecule and has an epoxy equivalent weight in the range between about 150 to about 8000; (4) treating and at least partially neutralizing the admixture reaction product medium with a basic reagent selected from ammonia and amines, thereby forming a substantially homogeneous single phase solution; and dispersing the said solution into a sufficient quantity of water to provide a stable aqueous dispersion of mixed resins having a solids content in the range between about 15 to about 40 weight percent. The aminoplast component is present in the amount of about 1 to about 12 weight percent, the monomers are present in the amount of about 20 to about 40 weight percent and the epoxy resin component is present in the amount of about 48 to about 79 weight percent, said weight percents being based on the total weight of aminoplast, monomers and epoxy resin components. Sufficient organic solvent is used to render the resin components fluid, generally about 30 to about 85 weight based on the total weight of aminoplast, polymerized monomers, epoxy resin and organic solvent.

Aminoplast Component

The aminoplast component employed can be any of the aldehyde condensation products of compounds such as urea, ethylene urea, dicyandiamide, various triazines, e.g., melamine, benzoguanamine and acetoguanamine, and the like; and mixtures and etherified derivatives of these condensation products.

Procedures for preparing aminoplasts are described in *Aminoplasts*, C. P. Vale (Cleaver-Hume Press, Ltd., London). Further illustration of aminoplast preparation and application is set forth in U.S. Pat. Nos. 2,957,835; 3,501,429; 3,522,159; 3,535,148; 3,773,721; 3,852,375; 3,891,590; 3,954,715; 3,965,058; 3,979,478; 4,071,578; and the like.

The aldehyde used in preparation of the aminoplasts may be (1) monofunctional or (2) polyfunctional, having an at least two aldehyde groups separated by at most one carbon atom; such as formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid or mildly alkaline catalyst. When using acrolein, glyoxal, acetaldehyde, propionaldehyde, or butyraldehyde, condensation is generally accomplished by combining the reactants in the presence of a strongly acid catalyst, neutralizing the reaction product, adding more aldehyde, and further reacting in the presence of a mildy acid, or alkaline catalyst. The preferred aldehyde is formaldehyde.

The aldehyde condensation products (i.e., aminoplasts) contain methylol or similar alkylol groups, the structure of the alkylol group depending upon the particular aldehyde employed. All or part of these alkylol groups may be etherified by reaction with an alcohol. Among the preferred amine-aldehyde products for use in the present invention are those which are substantially alkylated by an etherification reaction, i.e., in which at least a major portion of the alkylol groups have been reacted with an alcohol. Essentially any monohydric alcohol can be employed for this purpose, including such alcohols as methanol, ethanol, propanol, butanol, heptanol and other alkanols having up to about 12 carbon atoms or more, as well as benzyl alcohol and other aromatic alcohols, cyclic alcohols such as cyclohexanol, monoethers of glycols such as the Cellosolves and Carbitols, and halogen-substituted or other substituted alcohols, such as 3-chloro-propanol.

When using alcohols having more than about 4 carbon atoms, the methylol groups are first etherified with a lower alcohol containing 1 to 4 carbon atoms followed by ether interchange reaction to replace the lower alcohols with the higher ones. The preferred alcohols are methanol, butanol, and similar lower alkanols with methanol being most preferred.

The preferred aminoplasts are those which are soluble or substantially hydratable and dispersible in aqueous media. Suitable aminoplasts include those which are substantially miscible in all proportions with aqueous alcohol solvent media, such as 50/50 1-butanol/water mixture. Particularly preferred aminoplasts are those based on melamine, formaldehyde and methanol.

In the preparation of a present invention coating composition, the aminoplast component is dissolved in an organic solvent to form a solution. To the solution is subsequently added a selected mixture of polymerizable olefinically unsaturated monomers and a free radical-generating polymerization catalyst, and the vinyl polymerization of the monomer mixture is conducted in the presence of the aminoplast component in a manner which is more fully described hereinbelow. The amount of aminoplast component will be about 1 to about 12 weight percent, preferably about 4 to about 8 weight percent, based on total resin component weight, i.e., aminoplast polymerized monomers and epoxy resin components.

Organic Solvent Component

The organic solvent is preferably one which is substantially water-miscible, either in the form of a single polar compound, or as a mixture of compounds which can include non-polar constituents. The boiling point of the organic solvent component preferably will vary in the range between about 150° F. to about 500° F.

Suitable organic solvents, either alone or in admixture, include diisobutyl ketone, methyl isobutyl ketone, hydroxyethyl acetate, 2-ethoxyethyl acetate, propylene glycol monomethyl and/or monoethyl ether, ethylene glycol monobutyl ether, ethylene glycol, propylene glycol, butylene glycol, diethylene glycol, isopropanol, n-butanol, t-butanol, amyl alcohol, cyclohexanol, dioxane, tetrahydrofuran, dimethylformamide, dimethylacetamide, and the like. Non-polar solvents which can be included as a minor constituent of the organic solvent component include aliphatic and aromatic hydrocarbons such as naphtha, heptane, hexane, mineral spirits, decane, benzene, chlorobenzene, toluene, xylene, and the like.

In the preparation of the present invention coating composition, the organic solvent component is employed in a quantity between about 30 to about 85 weight percent, preferably in a quantity between about 40 to about 75 weight percent, based on the total weight of the aminoplast, monomer mixture, epoxy resin and organic solvent components present during the preparation of the coating composition.

Polymerizable Monomer Mixture Component

The mixture of monomers employed in the preparation of a present invention coating composition comprises between about 20 to about 90 weight percent of $\alpha,\beta$-olefinically unsaturated carboxylic acid, and between about 10 to about 80 weight percent of at least one olefinically unsaturated monomer which is copolymerizable with the carboxylic acid monomer.

The vinyl polymerization of the monomer mixture yields a carboxyl-containing acrylic resin. It is advantageous for purposes of the present invention (e.g., for the protective coating of metal surfaces) to select a monomer mixture which provides a carboxyl-containing acrylic resin which exhibits a Tg (glass transition temperature) in the range between about 0° to about 130° C., and preferably a Tg in the range between about 50° to about 90° C. The Tg parameter is that measured for an acrylic resin obtained by the polymerization of a monomer mixture under the step (2) conditions of the invention process, excluding the presence of the aminoplast components.

Suitable $\alpha,\beta$-olefinically unsaturated carboxylic acid monomers include acrylic acid, methacrylic acid, crotonic acid, itaconic acid (or anhydride), maleic acid (or anhydride), fumaric acid, the monoesters of the dicarboxylic acid monomers such as methyl hydrogen maleate, ethyl hydrogen fumarate, and the like.

The one or more other constituents of the polymerizable monomer mixture are alkyl esters of $\alpha,\beta$-olefinically unsaturated carboxylic acids, for example methyl, ethyl, propyl, butyl, hexyl, ethylhexyl and lauryl acrylate, methacrylate and crotonate; dimethyl maleate; dibutylfumarate and dihexylitaconate; and mixtures thereof.

The polymerizable monomer mixture can also include one or more monomers selected from vinyl aromatic compounds. Illustrative of such compounds are styrene, alkylstyrenes, halostyrenes, $\alpha$-methylstyrene, isopropenyltoluene, vinylnaphthalene, and the like.

Other suitable vinyl polymerization monomer species include vinyl chloride, acrylonitrile, methacrylonitrile, vinyl acetate, vinyl propionate, vinyl stearate, acrylamide, methacrylamide, and the like.

The preferred monomers are methylacrylate, ethyl acrylate and acrylic acid. The amount of monomers that are polymerized are that amount which will produce a polymer having a weight percentage in the mixed resin system of about 20 to about 40 weight percent, preferably about 25 to about 35 weight percent, said weight percents being based on the total weight of aminoplast, polymerized monomers and epoxy resin components.

Epoxy Resin Component

The epoxy resins useful in this invention are glycidyl polyethers of polyhydric phenols and hydrogenated phenols and contain more than one 1,2-epoxide group per molecule. Such polyepoxide resins are derived from an epihalohydrin and a polyhydric phenol or hydrogenated phenol and have epoxide equivalent weights of about 150 to about 8,000. Examples of epihalohydrins are epichlorohydrin, epibromohydrin and epiiodohydrin with epichlorohydrin being preferred. Polyhydric phenols are exemplified by resorcinol, hydroquinone, p,p'-dihydroxydiphenylpropane (or Bisphenol A as it is commonly called), p,p'-dihydroxydiphenyl ethane, bis(2-hydroxynaphthyl)methane, 1-5-dihydroxynaphthalene, novolak resins made from the reaction of mono and diphenols with aldehydes, phloroglucinol and the like with Bisphenol A being preferred. Epoxy resins made from hydrogenated versions of these phenols are also useful in this invention. These epoxy resins are well known in the art and are made in desired molecular weights by reacting the epichlorohydrin and the polyhydric compound in various ratios or by reacting a dihydric phenol with a lower molecular weight epoxy resin. Particularly preferred epoxy resins for use in this invention are glycidyl polyethers of Bisphenol A having epoxide equivalent weights of about 1000 to about 4000.

In the preparation of the stable aqueous dispersions of this invention, between about 48 to about 79 weight percent, preferably between about 57 to about 71 weight percent, said weight percents being based on total weight of aminoplast, polymerized monomers and epoxy resin components, of a selected epoxy resin are admixed and interacted with the product solution resulting from the previously conducted polymerization of the monomer mixture component in the presence of the aminoplast component.

SPECIFIC ASPECTS OF DISPERSION PREPARATION

The aminoplast component is admixed with the organic solvent and heated until the aminoplast is essentially completely dissolved. In some cases, the aminoplast may only partly dissolve with the undissolved portion remaining dispersed.

The organic solvent medium coating the aminoplast is heated to a temperature in the range between about 120° to about 300° F. To the heated solvent medium is added the monomer mixture component which contains a vinyl polymerization catalyst, i.e., a free radical producing catalyst. The catalyst is employed in a quantity between about 0.2 to about 14 weight percent, based on the weight of the monomer mixture. The quantity of catalyst must be sufficient to promote the copolymerization of the monomer constituents under the processing conditions. A preferred polymerization catalyst is an organic peroxide which is free radical-generating under the polymerization conditions, e.g., benzoyl peroxide, tertiary-butyl peroctoate, and the like. Other useful catalysts are the azo catalyst, e.g., azobisisobutyryl nitrile.

The homogeneous blend of polymerization catalyst and monomer mixture is added slowly to the heated solvent medium at a uniform rate. The period of addition can vary in the range between about 0.5 to about 6 hours, and, on the average, the addition period will vary in the range between about 1 to about 4 hours.

While not wishing to be bound by any theory or mechanism of reaction, there is some evidence that during the course of the vinyl polymerization reaction, some interaction occurs between one or more of the monomer constituents and the aminoplast component, and there is some linkage formed between the aminoplast and the acrylic copolymer which concomitantly has formed during the polymerization reaction.

Upon the completion of the polymerization reaction period, in a preferred embodiment the resultant polymerization medium is in the form of a clear homogeneous solution. While maintaining the said product solution at a temperature in the range of about 100° to about 300° F., the epoxy resin component is added to the heated solution with the aid of efficient stirring. The heating and stirring is continued for an additional period between about 0.1 to about 2 hours to permit interaction and equilibration between the aminoplast and acrylic copolymer and epoxy resin components to be completed. Alternatively, the polymer solution can be added to the epoxy resin with heating and stirring as described above.

Depending on the combination of factors involved, the reaction product medium will vary between being a clear solution or a solution which exhibits a milky iridescence. It is highly preferred that the reaction product medium does not contain any filterable solids when it is subjected to the neutralization step of the invention process.

The reaction product medium is treated with a basic reagent to at least partially neutralize the carboxylic acidity which is present. It is essential that the degree of neutralization be sufficient to provide a product medium pH which is in the range between about 2 to about 10, and preferably in the range between about 4 and about 8. The resultant neutralized product medium normally is in the form of a clear single phase solution. Besides improving the solubility properties of the resinous constituents of the product medium, the neutralization step suppresses the level of functional group interaction and imparts stability to the product medium.

As another important aspect of the present invention, it is essential that the nuetralized carboxylic acid groups in the dispersion coating composition be converted to free carboxylic acid groups during any subsequent heat-curing cycle to which the coating composition is subjected. In order to satisfy this requirement, it is preferred to employ a basic reagent for the neutralization step which is either ammonia or an organic amine.

Illustrative of suitable basic reagents are primary, secondary and tertiary amine compounds, such as ethylamine, butylamine, dimethylamine, diisopropylamine, dimethylethylamine, cyclohexylamine, allylamine, benzylamine, m-toluidine, morpholine, ethanolamine, diethanolamine, triethanolamine, and the like, and other basic reagents such as ammonium hydroxide.

Having obtained a neutralized product medium which is nominally a single phase solution containing solubilized mixed resin solids, the said solution is admixed with an aqueous phase and agitated vigorously to effect a stable aqueous dispersion of the mixed resin solids in the form of an emulsion. The average particle size of the dispersed mixed resin solids is preferably less than one micron.

An aqueous dispersion of mixed resins produced in accordance with the present invention process inherently has exceptional phase stability and shelf-life. A typical aqueous dispersion coating composition of the present invention can remain substantially unchanged for more than one year at 77° F. An invention aqueous dispersion coating composition is capable of tolerating a 120° F. temperature for more than three months without any apparent visible change in the dispersion phases.

The quantity of water employed for the dispersion-forming procedure can vary over a broad range as dictated by practical considerations. A typical aqueous dispersion will have a solids content in the range between about 15 to about 40 weight percent, and preferably in the range between about 20 to about 30 weight percent, based on the total weight of the aqueous dispersion.

Optionally there can be incorporated into the invention aqueous dispersion coating composition other components which do not interfere with the stability and other advantageous properties of the coating composition. Illustrative of an additional component which may be employed is between about 0.05–5 weight percent of a plasticizer, based on the weight of the resinous film-forming solids in a coating composition. Typical plasticizers include butyl benzyl phthalate, dibutyl phthalate, triphenyl phosphate, dicyclohexyl phthalate, dibenzyl phthalate, mixed benzoic acid and fatty oil acid esters of pentaerythritol, diethyleneglycol dibenzoate, butyl phthalyl butyl glycolate, tricresyl phosphate, toluene ethyl sulfonamide, hexamethylene diphthalate, and the like. Additional other components are colorants, waxes and the like.

As noted previously, during the baking and curing phase the volatile basic reagent employed to neutralize the coating composition evolves from the applied coating, thereby providing free reactive carboxyl groups. The said reactive carboxyl groups interact with the epoxy groups of the epoxy component to yield cross-linked ester linkages. Hydroxyl groups which are initially present and which are formed in situ during the baking cycle are highly reactive and condense with the aminoplast component, thereby providing an additional crosslinking mechanism.

The coating compositions of this invention are particularly useful as coating compositions for the interior of aluminum and steel cans and can be applied to the interior of said cans by airless spray application. The closures of such cans can also be coated with the compositions of this invention, such coatings being applied by roller coating processes. The coatings for cans are applied to dry film thicknesses of 0.1 to 0.5 mil and are cured by passing the metal through gas fired ovens heated to 315° to 425° F. in stages. The total residence time in these ovens is a matter of seconds, 30 seconds to 4 minutes.

In other applications, i.e., as metal primer coatings, the coating compositions are cured at a temperature of about 300° F. to about 500° F. for a time sufficient to obtain a cure. The coating compositions can be formulated into clear coatings as hereinbefore described or into pigmented coatings. Pigments can be added using well known formulating procedures. Other additives which can be incorporated in the coating compositions are coalescing solvents, leveling agents, wetting agents, dispersions of other resins, water soluble resins, thickening agents, suspending agents, surfactants, defoamers, adhesion promoters, and the like.

The following examples are presented to more clearly define the invention. Parts and percentages unless otherwise designated are parts and percentages by weight.

EXAMPLE 1

To a suitable reactor equipped with a stirrer, temperature recording device, reflux condenser and dropping funnel were added 60 parts of hexamethoxymethyl melamine (Cymel 300 available from American Cyanamid Co.), 220 parts of ethylene glycol monobutyl ether and 406 parts of n-butanol. To the dropping funnel were added 128 parts of methacrylic acid, 80 parts of styrene, 88 parts of ethyl acrylate and 40 parts of a 50/50 blend of benzoyl peroxide and tricresyl phosphate. Heat and stirring were applied raising the reactor contents to 85° C. At this temperature, the slow addition of the monomer-catalyst solution from the dropping funnel was begun. The addition was completed after 90 minutes with the temperature rising to 104° C. The temperature was held at 104°–107° C. for 90 minutes to complete the polymerization reaction. 696 Parts of pulverized glycidyl polyether of Bisphenol A having an epoxide equivalent weight of 2700 and a melting point of about 150° C. were then added. Heating and stirring were continued until the glycidyl polyether was dissolved, a period of about 45 minutes. N,N-dimethylaminoethanol, 114 parts, was then added. After 25 minutes and with the temperature at 96° C., 1000 parts of deionized water were added. Ten minutes later, 1750 parts of deionized water were added. When thoroughly mixed, the emulsion product was cooled and stored in appropriate containers. The stable emulsion product had a Brookfield viscosity of 22.5 cps. at 25° C. (a Zahn 2 viscosity of 19 seconds,) a solids content of 23.02%, a weight per gallon (wt/gal) of 8.54 lbs. and a pH of 8.15. After 3 weeks at room temperature, the composition gelled.

The insides of 12 ounce aluminum and electrolytic tin plated (ETP) steel cans were coated with the coating composition using airless spray, to a dry film weight of 115 to 125 mg. per can (beer weight). The coatings were cured by baking for 60 seconds at a peak metal temperature of 188° C. The continuity of the coatings was determined by a conductivity test carried out by filling the coated can with a 10% solution of sodium chloride in water and then determining the milliamperes of leakage current through the coating 30 seconds after a potential of 12 volts is applied between the salt solution and the can exterior. High readings indicate defects in the coating, e.g., craters, voids, bubbles, etc., which in use could result in contamination of the can contents and/or corrosion of the container. A milliamp reading (also referred to as Enamel Rater reading) of 0 to 25 is acceptable. The conductivity of the coatings was found to vary from 0–20 milliamps (ma) with an average, based on 24 cans, of 6.2 ma. When applied at beverage weights, i.e., 175 to 185 mg. per can, the milliamp reading was 0 for 24 cans.

The blister threshold, i.e., the applied dry film weight at which blisters or bubbles form in the film from escaping solvent or water, was greater than 180 mg.

Films were cast from the coating composition onto electrolytic tin plated (ETP) steel panels to a dry film thickness of 0.2 mil using a wire wound Meyer rod. After baking at 188° C. for one minute, the films were well cured. After 10 minutes immersion in a water bath heated to 82° C., the film exhibited no blushing and passed the wet adhesion test with a rating of 10. The wet adhesion test was conducted as follows: within one minute of removal from the water bath described above, the film surface was dried with a cloth and scribed with a cross-hatch pattern. A high tack cellophane tape was applied over the scribed portion and was removed with a jerk. The amount of film which remained on the panel was visually estimated and was rated as 10 for no removal and 0 for total removal.

The double coat adhesion was tested by applying a second coating over the first cured coating using the same film weight and curing conditions as used for the first coating. The wet adhesion was rated as 7–8.

In all of the following examples the wet adhesion as described above of single coatings was excellent. The adhesion tests reported in these examples pertain to double coated panels and cans.

EXAMPLE 2

Using the same procedure described in Example 1, 60 parts of hexamethoxymethyl melamine (Cymel 303 available from American Cyanamid Co.) were dissolved in 228 parts of ethylene glycol monobutyl ether and 342 parts of n-butanol. To this solution heated to 93° C., was added over a 90 minute period a mixture of 128 parts of methacrylic acid, 80 parts of styrene, 88 parts of ethyl acrylate and 40 parts of a 50/50 blend of benzoyl peroxide and tricresyl phosphate. After holding at 93° C. for 3 hours to complete the polymerization, 696 parts of pulverized glycidyl polyether described in Example 1 were added. After one hour with the temperature at 93° C., the glycidyl polyether had dissolved. N,N-dimethylaminoethanol, 57 parts, was added followed by 47 parts of triethylamine. After holding at 95° to 112° C. for 30 minutes, 3186 parts of deionized water were added over a 15 minute period. When thoroughly mixed, the resulting emulsion was cooled and stored in an appropriate container. The emulsion product had a solids content of 21.96%, a wt/gal. of 8.57 lbs., a pH of 7.7, an acid value of 49.8 and a Zahn 2 viscosity at 25° C. of 23 seconds. The product exhibited no instability after 2 months at room temperature, 100° F. and 120° F.

The interiors of 12 ounce aluminum and ETP steel cans were coated, cured and tested using the procedure described in Example 1. The Enamel Rating at beer weights was 44.5 ma. and at beverage weights, 4.6 ma. The blister threshold was less than 170 mg.

The wet adhesion of coatings on aluminum panels, double coated and cured as described in Example 1, was 7–8 and on ETP steel panels the wet adhesion was 4–6. The solvent resistance of the cured coating was determined by rubbing the coating with methylethyl ketone (MEK). The coating passed 21 double rubs.

EXAMPLE 3

Using the same procedure as described in Example 1, a monomer-catalyst solution of 128 parts of methacrylic acid, 80 parts of styrene, 88 parts of ethyl acrylate and 36 parts of t-butyl peroctoate was polymerized in a solution of 60 parts of hexamethoxymethyl melamine (Cymel 303), 228 parts of ethylene glycol monobutyl ether and 324 parts of n-butanol. When the polymerization was completed, 696 parts of the glycidyl polyether described in Example 1 were added and dissolved in the reaction mixture, followed by 114 parts of N,N-dimethylaminoethanol and then by 3204 parts of deionized water. The resulting stable emulsion had a solids content of 21.85%, a wt/gal of 8.54 lbs., a pH of 7.9 and an acid value of 46.25. The product was still stable after 3 months at room temperature, 100° F. and 120° F.

The solids were adjusted with water to 19% and the viscosity to 19 seconds (Zahn 2 at 25° C.). The interiors of 12 ounce aluminum ETP steel cans were coated, cured and tested using the procedure described in Example 1. The Enamel Rating at beer weights was 10.2 ma. and at beverage weights, 2.4 ma. The blister threshold was 155 mg.

The wet adhesion of coatings on aluminum and ETP steel panels, double coated and cured as described in Example 1, was poor. The double coat wet adhesion of the coatings on the interior of aluminum cans was also poor, but on ETP steel cans, the cured coat adhesion was perfect. The solvent resistance of the cured coatings was 100 MEK double rubs.

EXAMPLE 4

Using the same procedure described in Example 1, a monomer-catalyst solution of 128 parts of methacrylic acid, 80 parts of styrene, 88 parts of ethyl acrylate and 20 parts of benzoyl peroxide was polymerized in a solution of 68 parts of Cymel 370 available from American Cyanamid Co. (hexamethoxymethyl melamine at 88% solids in isopropanol), 228 parts of ethylene glycol monobutyl ether and 334 parts of n-butanol. When the polymerization reaction was completed, 696 parts of pulverized glycidyl polyether described in Example 1 were added followed by 114 parts of N,N-dimethylaminoethanol and 3204 parts of deionized water. The resulting stable emulsion had a solids content of 22.18%, a wt/gal. of 8.59 lbs., a pH of 7.6 and an acid value of 52.6. The product was stable after 2 months at room temperature, 100° F. and 120° F.

The interiors of 12 ounce aluminum and ETP steel cans were coated, cured and tested using the procedure described in Example 1. The Enamel Rating at beer weights was 10.3 ma. and at beverage weights, 1.1 ma. The blister threshold was 145-150 mg.

The wet adhesion of coatings on aluminum and ETP steel panels, double coated and cured as described in Example 1, was poor. The double coat wet adhesion of the coatings on the interior of aluminum cans was also poor, but on ETP steel cans, the double coat adhesion was perfect. The cured coatings passed 50 MEK double rubs.

EXAMPLE 5

Using the same procedure described in Example 1, a monomer-catalyst solution of 137 parts of methacrylic acid, 86 parts of styrene, 94 parts of ethyl acrylate and 22 parts of benzoyl peroxide was polymerized in a solution of 280 parts of hexamethoxymethylamine (Cymel 303) in 220 parts of ethylene glycol monobutyl ether and 330 parts of n-butanol. When the polymerization reaction was completed, 645 parts of the glycidyl polyether described in Example 1 were added, followed by 123 parts of N,N-dimethylaminoethanol and 3147 parts of deionized water. The resulting stable emulsion had a solids content of 24.34%, a wt/gal. of 8.61 lbs., a pH of 7.7 and an acid value of 47.2. The dispersions were still stable after 3 months at room temperature and at 100° F., but had settled out at 120° F.

The solids and viscosity (Zahn 2 at 25° C.) were adjusted to 22% and 30 seconds respectively with water.

The interiors of 12 ounce aluminum and ETP steel cans were coated, cured and tested using the procedure described in Example 1. The Enamel Rating at beer weights was 2.3 ma., and at beverage weights, 1.5 ma. The blister threshold was 135 mg.

The wet adhesion of double coatings on aluminum and ETP steel panels and on ETP steel cans was poor. The wet adhesion, however, on aluminum cans had a rating of 7-8. The solvent resistance of the cured coatings was 28 MEK double rubs.

EXAMPLE 6

Using the same procedure described in Example 1, a monomer-catalyst solution of 137 parts of methacrylic acid, 87 parts of styrene, 95 parts of ethyl acrylate and 22 parts of benzoyl peroxide was polymerized in a solution of 19 parts of hexamethoxymethyl melamine (Cymel 303) and 28 parts of hexabutoxymethyl melamine in 220 parts of ethylene glycol monobutyl ether and 330 parts of n-butanol. When the polymerization reaction was completed, 793 parts of the glycidyl polyether described in Example 1 were added followed by 123 parts of N,N-dimethylaminoethanol and 3150 parts of deionized water. The resulting stable emulsion had a solids content of 24.44, a wt/gal. of 8.62 lbs. and an acid value of 46.6. The dispersion was stable after 3 months at room temperature, but exhibited slight settling after 3 months at 100° F. and complete instability at 120° F.

The interiors of 12 ounce aluminum and ETP steel cans were coated, cured and tested using the procedures described in Example 1. The Enamel Rating at beer weights and at beverage weights was 7.7 ma. The blister threshold was 135 mg.

The wet adhesion of double coatings on both aluminum and ETP steel panels and cans was poor. The solvent resistance of the cured coatings was 50 MEK double rubs.

EXAMPLE 7

To a suitable reactor equipped as described in Example 1 were added 280 parts of n-butanol and 280 parts of ethylene glycol monobutyl ether. To the dropping funnel were added 129 parts of methacrylic acid, 131 parts of styrene, 197 parts of ethyl acrylate and 24 parts of benzoyl peroxide. Heating and stirring were begun and at 93° C., the addition of the monomer-catalyst solution was begun. After 90 minutes, all of the monomer-catalyst solution had been added and heating at 93°-95° C. was continued for 3 hours. After this heating period, 624 parts of pulverized glycidyl polyether of Bisphenol A having an epoxide equivalent weight of 1850 and a melting point of about 130° C. were added. Heating and stirring were continued and after 1 hour and 25 minutes at 108° C., 114 parts of N,N-dimethylaminoethanol were added followed 30 minutes later by 96 parts of hexamethoxymethyl melamine (Cymel 303). Heating was discontinued and at 88° C., 3128 parts of deionized water were added. The resulting dispersion after cooling had a solids content of 24.3%, a wt/gal. of 8.59 lbs., a pH of 7.7 and an acid value of 51.0. The dispersion was not stable. It completely settled out after 2 weeks at room temperature, 100° F. and 120° F.

The interiors of aluminum and ETP steel cans were spray coated, cured and tested as described in Example 1. The material was foamy and had poor atomization. The Enamel Rating at beer weights and at beverage weights was 9.3 and 4.4 ma. respectively. The blister threshold was 155 mg.

The wet adhesion on aluminum and EPT steel panels was excellent. The wet adhesion on aluminum cans was poor but on ETP steel cans, it was almost perfect. The solvent resistance of the cured coatings was 18 MEK double rubs.

EXAMPLE 8

Using the same procedure described in Example 1, 4.2 parts of methacrylic acid, 2.8 parts of styrene and 3.11 parts of ethyl acrylate were copolymerized with 0.65 part of benzoyl peroxide in a solution of 2.16 parts of hexamethoxymethyl melamine (Cymel 303), 6.54 parts of ethylene glycol monobutyl ether and 9.8 parts of n-butanol. When the polymerization was completed, 23.04 parts of pulverized glycidyl polyether of Bisphenol A as described in Example 1 were added and dissolved. N,N-dimethylaminoethanol, 3.7 parts, was added followed by 93.8 parts of deionized water. The resulting dispersion had a solids content of 24.08%, a wt/gal. of 8.62 lbs., a pH of 7.7 and an acid value of 59.9.

The solids and viscosity (Zahn 2 at 25° C.) were adjusted with water to 23% and 24", respectively. The interiors of aluminum and ETP steel cans were spray coated, cured and tested as described in Example 1. The Enamel Rating at beer and beverage weights was 14.2 and 1.3 ma., respectively. The blister threshold was 210 mg.

The wet adhesion on aluminum panels was good, a 7–8 rating, but was poor on ETP steel panels. The wet adhesion on aluminum and ETP steel cans was poor. Solvent resistance was 16 MEK double rubs.

EXAMPLE 9

Using the same procedure described in Example 1, a monomer-catalyst solution of 140 parts of methacrylic acid, 122 parts of styrene, 133 parts of ethyl acrylate and 25 parts of benzoyl peroxide was polymerized in a solution of 72 parts of hexamethoxymethyl melamine (Cymel 303) in 326 parts of n-butanol and 218 parts of ethylene glycol monobutyl ether. When the polymerization reaction was complete, 708 parts of the glycidyl polyether described in Example 1 were added followed by 123 parts of N,N-dimethylaminoethanol and 3132 parts of deionized water. The resulting stable emulsion had a solids content of 24.21%, a wt/gal. of 8.61, a pH of 7.8 and an acid value of 54.5. The stability was excellent after 3 months at room temperature and 100° F. with slight settling at 120° F.

The solids and viscosity (Zahn 2 at 25° C.) were adjusted with water to 23.2% and 25 seconds respectively. The interiors of aluminum and ETP steel cans were spray coated, cured and tested as described in Example 1. The Enamel Rating at beer and beverage weights was 20.9 and 5.8 ma., respectively. The blister threshold was 135 mg.

The wet adhesion on aluminum panels was excellent but poor on ETP steel panels. The wet adhesion on aluminum can interiors was poor and was just slightly better on the interiors of ETP steel cans. Solvent resistance of the cured coatings was 19 MEK double rubs.

EXAMPLE 10

Using the same procedure described in Example 1, a monomer-catalyst solution of 100.1 parts of acrylic acid, 91 parts of methyl acrylate, 91 parts of ethyl acrylate and 23.2 parts of a catalyst blend of 78% benzoyl peroxide and 22% water was polymerized in a solution of 72 parts of hexamethoxymethyl melamine (Cymel 303) in 408.5 parts of n-butanol and 273 parts of ethylene glycol monobutyl ether. When the polymerization reaction was completed, 828 parts of the glycidyl polyether described in Example 1 were added followed by 111.4 parts of N,N-dimethylaminoethanol and 3001.1 parts of deionized water. The resulting stable emulsion had a solids content of 24.63%, a wt/gal. of 8.6 lbs. and a pH of 7.0. After 2 months at room temperature, 100° F. and 120° F., the dispersion exhibited medium to large settling which could be stirred back in.

The interiors of aluminum and ETP steel cans were spray coated, cured and tested as described in Example 1. The Enamel Ratings at beer and beverage weights was 0.1 and 0.04 ma., respectively. The blister threshold was 245–250 mg.

The wet adhesion on aluminum panels and on the interior of aluminum and ETP steel cans was perfect. The wet adhesion on ETP steel panels was almost perfect. The solvent resistance was 4 MEK double rubs.

EXAMPLE 11

Using the same procedure described in Example 1, a monomer-catalyst solution of 115.5 parts of acrylic acid, 88.1 parts of methyl methacrylate, 22.0 parts of 2-ethylhexyl acrylate and 18.5 parts of a blend of 78% benzoyl peroxide and 22% water were polymerized in a solution of 72 parts of hexamethoxymethyl melamine (Cymel 303) in 424.9 parts of n-butanol and 283.3 parts of ethylene glycol monobutyl ether. When the polymerization reaction was completed, 888 parts of the glycidyl polyether described in Example 1 were added followed by 85.7 parts of N.N-dimethylaminoethanol and 3002 parts of deionized water. The resulting stable dispersion had a solids content of 25.4%, a wt/gal. of 8.6 lbs. and a pH of 6.67. The dispersion exhibited no instability after 3 months at room temperature, 100° F. and 120° F.

The interior of aluminum and ETP steel cans were spray coated, cured and tested as described in Example 1. The Enamel Rating at beer and beverage weights was 5.8 and 0.4 ma., respectively. The blister threshold was 160 mg.

The wet adhesion on aluminum panels was almost perfect (9–10) and on ETP steel panels, it was 7–8. The wet adhesion of coatings on the interior of aluminum cans was perfect (10) and on ETP steel cans almost perfect (9–10). The solvent resistance was 13 MEK double rubs.

EXAMPLE 12

Using the same procedure described in Example 1, a monomer-catalyst solution of 115.5 parts of acrylic acid, 90 parts of methyl methacrylate, 22.5 parts of 2-ethylhexyl acrylate and 15.4 parts of a blend of 78% benzoyl peroxide and 22% water was polymerized in a solution of 72 parts of hexamethoxymethyl melamine (Cymel 303) in 433.5 parts of n-butanol and 289 parts of ethylene glycol monobutyl ether. When the polymerization reaction was completed, 888 parts of the glycidyl polyether described in Example 1 were added, followed by 71.4 parts of N,N-dimethylaminoethanol and 3006.2 parts of deionized water. The resulting stable dispersion had a solids content of 24,83%, a wt/gal. of 8.56 lbs. and a pH of 6.1. The dispersion exhibited soft settling after 3 months at room temperature, 100° F. and 120° F.

Using the procedure described in Example 1, the interior of aluminum and ETP steel cans were spray coated, cured and tested. The Enamel Rating at beer and beverage weights was 1.5 and 0.8 ma. respectively. The blister threshold was 200 mg.

The wet adhesion on the interior of aluminum and ETP steel cans was perfect (10), on aluminum panels almost perfect (9–10) and on ETP steel panels 4–6. The solvent resistance was 15 MEK double rubs.

EXAMPLE 13

Using the same procedure described in Example 1, a monomer-catalyst solution of 112.6 parts of acrylic acid, 102.3 parts of methyl acrylate, 102.3 parts of ethyl acrylate and 26 parts of a blend of 78% benzoyl peroxide and 22% water was polymerized in a solution of 81 parts of hexamethoxymethyl melamine (Cymel 303) in 461.3 parts of n-butanol and 307.5 parts of ethylene glycol monobutyl ether. When the polymerization reaction was completed, 931.5 parts of the glycidyl polyether described in Example 1 were added followed by 139.2 parts of N,N-dimethylaminoethanol and 2737.3 parts of deionized water. The resulting stable dispersion had a solids content of 28.0%, a wt/gal. of 8.62 lbs. and a pH of 7.95. The dispersion exhibited soft settling after 3 months at room temperature, 100° F. and 120° F.

The solids and viscosity (Zahn 2 at 25° C.) were adjusted with water to 26.8% and 21 seconds respectively. The interior of 12 ounce aluminum and ETP steel cans were spray coated using the procedure described in Example 1. The Enamel Rating at beer and beverage weights was 0.4 and 0 ma. respectively. The blister threshold was 230–235 mg.

The wet adhesion on aluminum and ETP steel panel and can interiors was perfect. The solvent resistance was 50 MEK double rubs.

EXAMPLE 14

Using the same procedure described in Example 1, a monomer-catalyst solution of 403.6 parts of acrylic acid, 366.6 parts of methyl acrylate, 366.6 parts of ethyl acrylate and 93.2 parts of a catalyst blend of 78% benzoyl peroxide and 22% water was polymerized in a solution of 290.3 parts of hexamethoxymethyl melamine (Cymel 303) in 887.8 parts of n-butanol and 591.7 parts of ethylene glycol monobutyl ether.

To another reactor were added 165.2 parts of the diglycidyl ether of Bisphenol A having an epoxide equivalent weight of 190 and 83.2 parts of Bisphenol A. Heat was applied raising the temperature to 121° C. Potassium hydroxide, 0.042 part of a 45% aqueous solution, was added, and heating was continued raising the temperature to 177° C. Heating was discontinued and the temperature was allowed to rise to 204° C. due to the exothermic reaction. The temperature was then held at 204° C. for 3 hours and 45 minutes. Heating was discontinued and 69.9 parts ethylene glycol monobutyl ether were added over a five minute period with the temperature dropping to 177° C. N-butyl alcohol 104.7 parts was then added with the temperature dropping to 131° C. The temperature was then lowered to 99° C. and 223.2 parts of the hexamethoxymethyl melamine/polymer solution, described in the first paragraph of this example, were added over a 5 minute period with the temperature dropping to 82° C. The temperature was raised to 93° C. and was held at 93° C. for 45 minutes. Dimethylethanol amine, 15.8 parts, and triethylamine, 17.9 parts were then added. The temperature was held at 93°–96° C. for 15 minutes. Deionized water, 1500 parts, was then added over a 10 minute period. The reaction product was cooled to 38° C., was filtered and stored. The resulting product was a stable dispersion having a solids content of 24.34%. Coatings on steel and aluminum cans, prepared as described in the preceding examples, exhibited excellent coating properties.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing a stable aqueous dispersion of mixed resins comprising the steps of (1) preparing a solution of an aminoplast in a substantially water-miscible organic solvent; (2) heating the solution and adding thereto a mixture of vinyl polymerization catalyst and $\alpha,\beta$-olefinically unsaturated carboxylic acid monomer and at least one other vinyl polymerizable monomer to form a polymerization product solution wherein the unsaturated monocarboxylic acid monomer is present in the amount of about 20 to about 90 weight percent based on total monomer weight; (3) admixing and heating together the polymerization product solution and an epoxy resin; (4) at least partially neutralizing the admixture with ammonia or an organic amine; and (5) dispersing the admixture into an aqueous medium to provide a stable aqueous dispersion of mixed resin solids having a solids content in the range of between about 15 to about 40 weight percent wherein the aminoplast component is present in the amount of about 1 to about 12 weight percent, the monomers are present in the amount of about 20 to about 40 weight percent and the epoxy resin component is present in the amount of about 48 to about 79 weight percent, said weight percents being based on the total weight of aminoplast, monomers and epoxy resin components.

2. A process for the preparation of a stable aqueous dispersion of mixed resins adapted for application as a thermosetting protective coating for metal surfaces, which process comprises the steps of (1) preparing a solution of an aminoplast component dissolved in a substantially water-miscible organic solvent; (2) heating and maintaining the temperature of the solution in the range between about 120° and about 300° F., and adding to the solution at a uniform rate over a period between about 0.5 to about 6 hours a blend of a vinyl polymerization catalyst and monomers comprising (a) between about 20 to about 90 weight percent based on total monomer weight of $\alpha,\beta$-olefinically unsaturated carboxylic acid, and (b) 10 to about 80 weight percent based on total monomer weight of at least one olefinically unsaturated monomer which is copolymerizable with the carboxylic acid monomer, thereby forming a polymerization product solution; (3) admixing and interacting at a temperature between about 100° to about 300° F. the polymerization product solution and an epoxy resin component, wherein said epoxy resin is a glycidyl polyether of a polyhydric phenol or hydrogenated phenol and contains an average of more than one epoxide group per molecule and has an epoxy equivalent weight in the range between about 150 to about 8000; (4) treating and at least partially neutralizing the admixture reaction product medium with ammonia or an organic amine, thereby forming a substantially homogeneous single phase solution; and dispersing the said solution into a sufficient quantity of water to provide a stable aqueous dispersion of mixed resins having a solids content in the range of between about 15 to about 40 weight percent wherein the aminoplast component is present in the amount of about 1 to about 12 weight percent, the monomers are present in the amount of about 20 to about 40 weight percent and the epoxy resin component is present in the amount of about 48 to about 79 weight percent, said weight percents being based on the total weight of aminoplast, monomers and epoxy resin components.

3. A process in accordance with claim 2 wherein the aminoplast component is a melamine-aldehyde condensate derivative.

4. A process in accordance with claim 3 wherein the aminoplast component is a melamine-formaldehyde condensate etherified with methanol.

5. A process in accordance with claim 2 wherein the water-miscible organic solvent is selected from at least one of monohydric and polyhydric alcohols and ether derivatives thereof.

6. The process of claim 2 wherein the water-miscible organic solvent is present in the amount of about 30 to about 85 weight percent based on the total weight of aminoplast, monomers epoxy resin and organic solvent.

7. A process in accordance with claim 2 wherein the $\alpha,\beta$-olefinically unsaturated carboxylic acid monomer is acrylic acid or methacrylic acid.

8. A process in accordance with claim 2 wherein at least one of the monomers in the monomer mixture is an acrylic or methacrylic alkyl ester.

9. A process in accordance with claim 2 wherein at least one of the monomers in the monomer mixture is a vinyl aromatic compound.

10. A process in accordance with claim 2 wherein the epoxy resin component is a polyglycidyl ether of p,p'-dihydroxydiphenyl propane.

11. A process in accordance with claim 2 wherein the admixture reaction product medium is neutralized to a pH in the range between about 4 to about 8.

12. A process in accordance with claim 2 wherein the average particle size of the dispersed mixed resin solids phase is less than about one micron.

13. The process of claim 2 wherein the aminoplast is present in the amount of about 4 to about 8 weight percent, the monomers are present in the amount of about 25 to about 35 weight percent and the epoxy resin is present in the amount of about 57 to about 71 weight percent.

14. The process of claim 2 wherein the water-miscible solvent is present in the amount of about 40 to about 75 weight percent based on total weight of aminoplast, polymerized monomers, epoxy resin and solvent.

15. A stable aqueous dispersion of mixed resins prepared in accordance with the process of claim 2.

16. A method for protecting the surface of an article of manufacture which comprises applying to the surface a coating of a stable aqueous dispersion of heat-curable mixed resins, and heat-treating the coating to form an adherent thermoset film on the surface of the article, wherein the said stable aqueous dispersion coating composition is prepared by a process which comprises the steps of (1) preparing a solution of an aminoplast in a substantially water-miscible organic solvent; (2) heating the solution and adding thereto a mixture of vinyl polymerization catalyst and $\alpha,\beta$-olefinically unsaturated carboxylic acid monomer and at least one other vinyl polymerizable monomer to form a polymerization product solution wherein the unsaturated monocarboxylic acid monomer is present in the amount of about 20 to about 90 weight percent based on total monomer weight; (3) admixing and heating together the polymerization product solution and an epoxy resin; (4) at least partially neutralizing the admixture with ammonia or an organic amine; and (5) dispersing the admixture into an aqueous medium to provide a stable aqueous dispersion of mixed resin solids having a solids content in the range of between about 15 to about 40 weight percent wherein the aminoplast component is present in the amount of about 1 to about 12 weight percent, the monomers are present in the amount of about 20 to about 40 weight percent and the epoxy resin component is present in the amount of about 48 to about 79 weight percent, said weight percents being based on the total weight of aminoplast, monomers and epoxy resin components.

17. A method in accordance with claim 16 wherein the said stable aqueous dispersion coating composition is applied to the interior surface of metal containers.

* * * * *